Patented Mar. 26, 1946

2,397,179

UNITED STATES PATENT OFFICE 2,397,179

OLEO-RESINOUS COATING COMPOSITION AND METHOD OF PREPARING SAME

Herbert J. Wolfe, Maspeth, N. Y., assignor to American Can Company, New York, N. Y., a corporation of New Jersey No Drawing. Application December 17, 1941, Serial No. 423,401

4 Claims. (Cl. 106—222)

The present invention relates to the art of making finishing varnishes and protective coating compositions for application to metal surfaces such as for metal containers or cans and to an improved varnish or coating composition produced by the method steps and has particular reference to the incorporation of tri-alkyl phosphates in such compositions to provide for more rapid drying and increased covering characteristics. This invention is a continuation-in-part of my application Serial Number 260,658, filed in the United States Patent Office March 8, 1939.

Oleo-resinous types of finishing varnishes and coating compositions both clear and pigmented are extensively used in the fabrication of metal containers or cans, such coating being applied to the sheet metal surfaces which may be of terne plate, tin plate or the like. A difficulty which has been experienced in such use has to do with improper covering and adhesion, with unsatisfactory levelling of the conventional coating material on the metal surfaces and in the machine during application of the coating substance to the surface being coated as well as with too prolonged a drying time before a satisfactory smooth, hard, flexible film is obtained.

A major cause of the improper covering and adhesion difficulties mentioned may be traced to the thin greasy film of oil which necessarily remains on the metal surfaces from the lubricant used in certain steps in the manufacture of the sheet metal, such as in the rolling, in the tinning or in other metal coating operations. This film of oil prevents the varnishes or coating compositions from flowing out evenly and from adhering properly to the metal surfaces.

Conventional varnishes and coatings containing hydrocarbon solvents which represent by far the greatest percentage of solvents used, are dried by the application of heat but such heat cannot be brought into the range of intense heat of the order of 1000 to 1500 degrees Fahrenheit without sooting and blistering of the film coat. A relatively long period of time and a corresponding lesser heat therefore must be used. Any other solvents, which might not soot during drying at elevated temperatures, such as alcohols and esters, would not provide good solvency properties for the varnish type resins employed.

The present invention overcomes such difficulties first by improving the ability of the coating material to flow out evenly even on greasy metal surfaces and to adhere to such surfaces. Tri-alkyl phosphates are used to obtain these desired results. The use of tri-alkyl phosphates also greatly improves the gloss of the coated surface.

The use of tri-alkyl phosphate with oleo-resinous varnishes and coating compositions according to the present invention provides for an entirely new and faster drying procedure. When tri-alkyl phosphates are used intense heat of the order of 1000 to 1500 degrees Fahrenheit may be used in drying the coated surface to a smooth, hard, although flexible film. This is done by subjecting the coated surface to a zone of intense heat for only a few seconds.

By the use of tri-alkyl phosphates in the solvent phase of the varnish and coating composition, said composition also possesses greatly increased wetting powers so that less solvent is needed and the composition may be made with a higher percentage of solid contents in the resins or in the pigments or in both, giving a coating film of better surface covering strength, opacity, hardness, etc.

Another advantage in the use of tri-alkyl phosphates with oleo-resinous materials according to the present invention is that the improved coating composition, unlike conventional materials, will not skin or dry up on the coating rollers or in the spraying apparatus. The relatively high boiling and slow evaporating properties of the tri-alkyl phosphates used is responsible for this and is in marked contrast to the usual solvents used with the usual forms of coating materials.

The tri-alkyl phosphates possess a relatively narrow boiling range with the result that they are rapidly driven out of the films just as soon as the temperature of the drying medium is raised above the relatively high boiling point of the particular tri-alkyl phosphate used. This heat for drying is an intense heat and in the few seconds of drying, partial decomposition of some of the tri-alkyl phosphates takes place, leaving some phosphorous oxides in the film which increases adhesion by partially combining with the metal surfaces on which the film is deposited. Ordinary solvents have extended boiling ranges and therefore require longer periods of time to drive them off.

Mention has been made of an improved smoothness and a higher gloss of the coating compositions when tri-alkyl phosphates are used. It is believed a simple explanation can be given for this. The boiling range of the tri-alkyl phosphates is above the melting point of the resins employed in the improved coating material. Such resins, therefore are in a molten or plastic form before the solvent is driven off by the heat of drying and the composition has ample opportunity to flow or level out in its initial state while there is still a solvent present. A more glossy, smoother surface is the result.

In contrast to this are the conventional types of varnishes and coating compositions which lose much of their solvent before the temperature has reached the melting point of the resins. Without the solvent the material cannot flow evenly or smoothly and a spongy or pasty condition is reached before there is full opportunity for the levelling action. A less glossy film results.

The dried films of these improved tri-alkyl varnishes or coating compositions on their metallic surfaces being of extra hardness, higher gloss and having greater adhesion than conventional films, permit further handling as in subsequent fabrication into metal containers, etc., with a minimum of scratching or other handling damage. This greatly reduces spoilage and makes possible a considerable increase in the production rate with its attendant savings in cost.

An object of the invention is the provision of a method of producing an improved finishing varnish or surface coating composition which contains a high percentage of solids relative to the solvents at the time of mixing and while being applied, the resulting applied film being rapidly dried by intense heat which drives off the solvents in a minimum of time.

Another object is the provision of a method of making such a coating composition by oleo-resinous material in which an improved type of solvent is utilized for producing a quicker drying surface which possesses improved smoothness and hardness and one having improved adhesive properties so that a maximum of covering strength, protection of the under surface, and opacity when desired, are obtainable in the coated film.

Still another object is the provision of a method of preparing oleo-resinous varnishes or coating compositions by the use of tri-alkyl phosphates as a wetting agent and as a unique sharp boiling solvent.

Yet another object is the provision of a varnish or coating composition for metallic surfaces which is made up of oleo-resinous materials and tri-alkyl phosphates combined in accordance with the instant disclosed procedure.

Numerous other objects and advantages of the invention will be apparent as it is better understood from the following description which is of a preferred embodiment thereof.

In the manufacture of an oleo-resinous varnish or coating composition for surface coating of metallic sheet material for containers, etc., according to the present invention, a tri-alkyl phosphate is used. The amount of tri-alkyl phosphate can be varied to produce different results. Where a relatively small percentage of tri-alkyl phosphates is used such phosphates act principally as improved wetting agents. Large percentages of the tri-alkyl phosphates in addition to providing for an improved wetting action also act as sharp boiling solvents.

In explanation of the foregoing it may be stated generally that a small percentage of tri-alkyl phosphates will run substantially from ¼ percent to 10 percent of the total weight of the composition. With this small percentage the tri-alkyl phosphates action is largely that of wetting. As a result of such wetting action there is greatly improved levelling, better covering and superior adhesion of the coating material as compared with conventional varnishes and coating compositions not employing the tri-alkyl phosphates.

When the larger percentages of tri-alkyl phosphates are used (such percentages may include a range of from 10 percent to 50 percent) there is the same improved wetting action as before but the added quantities of tri-alkyl phosphates over the quantities required for wetting now are effective in an improved solvent action.

Such solvent action is not just the ordinary, obvious working of a solvent, but, as previously mentioned, leads to a greatly improved drying condition whereby intense heat and a short time (a matter of seconds) gives a much better dried film than the lower heat and longer time (many minutes) will give in drying the ordinary coating material.

The resins which provide the major portion of the film forming solids of the varnish or coating compositions of the present invention may be broadly designated as varnish type resins. This term includes the solid alkyd resins of the maleic anhydride-glycerine and similar resin types, as well as modified phenolic resins, cumarone-indene resins, rosin-glyceride ester gums, rosin-penta-erythritol ester gums, terpene-maleic resins as well as straight phenolic (so called 100 percent phenolic) resins, and fossil resins including kauri, copal and congo.

Another part of the varnish or coating composition of the present invention is the drying oils used as plasticizers. Such oils broadly may be classified as fast drying oils of high iodine value. Such a classification includes linseed, perilla, China-wood and dehydrated castor oils.

The tri-alkyl phosphates used in the present invention may be broadly classified as those in which the alkyl radical contains substantially from two to four carbon atoms. Tri-propyl and tri-butyl phosphates are examples of this class best adapted for use under present conditions. The use of these wetting and solvent agents for finishing varnishes and coating compositions has been discovered by applicant to be so far superior to the usual hydrocarbon thinners generally used that even conventional metal finishing varnishes and coating compositions when such tri-alkyl phosphates are substituted for the other solvents, produce improved coating films.

The following examples of preferred specific procedure are given to show satisfactory steps for carrying out the invention and for making the improved varnishes and coating compositions of the invention.

*Example 1*

Twenty-five (25) pounds of solid alkyd resin of the maleic anhydride, glycerine and rosin type are cooked into fifty (50) pounds of raw linseed oil at a temperature of from 400 to 600 degrees Fahrenheit until a clear solution results. This cooking is done in a standard varnish kettle and will require from forty-five minutes to an hour and a half depending upon the amount of heat.

The kettle of heated mixture is removed from the fire and the contents are allowed to cool down to 300 degrees Fahrenheit. To this is added one pound of tri-propyl phosphate (or any of the tri-alkyl phosphates classified above or a combination of the same) which is stirred into the mass. It may be stated at this time that this amount of tri-alkyl phosphate with the othtr proportions of resin and drying oil constitutes a small percentage of the wetting agent as referred to above. The addition of the tri-alkyl phosphate during a thorough stirring lowers the temperature of the mixture. Since only a small percentage of tri-alkyl phosphate is being used a suitable hydrocarbon solvent next can or may be added to properly thin the mixture. About one pound of cobalt linoleate or cobalt naphthenate drier, representing roughly 0.05 pound of cobalt metal, is then added to the mass as a drying or oxidation catalyst. When thoroughly mixed, the resulting clear finishing varnish is ready for use.

To convert this varnish into a colored or opaque coating composition it is necessary merely to add the desired pigment. This is done by grinding the mass in a ball mill or in a roller mill in the conventional manner.

Example 2

Seventy-five (75) pounds of modified phenolic resin are cooked, in the same manner as described in Example 1, into twenty-five (25) pounds of perilla oil at a temperature of from 400 to 600 degrees Fahrenheit until a clear solution results.

The kettle of heated mixture is removed from the fire and the contents are allowed to cool down to 300 degrees Fahrenheit. To this is added fifty (50) pounds of tri-butyl phosphate which is thoroughly stirred into the mass (or any of the tri-alkyl phosphates classified above or a combination of the same). This constitutes a large percentage of tri-alkyl phosphate and is sufficient for the desired wetting action and also is adequate for all of the solvent needed.

Substantially three pounds of cobalt linoleate or cobalt naphthenate drier, representing roughly 0.5 pound of cobalt metal, next is added to the mass as a drying catalyst, a thorough mixing of the compound being had as before. A finishing varnish is thus prepared or by the addition of pigments, as previously explained, an opaque composition may be obtained.

By the use of the tri-alkyl phosphates in the coating composition the immediate wetting action greatly assists in the mixing action and the grinding or other mixing time may be reduced materially.

The resulting improved coating composition is stable upon storage, the tri-alkyl phosphate used prohibiting livering and seeding, a fault often present in conventional coatings prior to the present invention and wherein the instant disclosed type of solvent and wetting agent is not employed. Pigmented coatings of the usual kind containing cadmium red as a major portion of the pigment have been most difficult to hold in storage on account of this livering action, but when used in the instant improved coating composition, remain in suspension thereby maintaining the smooth, homogeneous nature of the coating.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

I claim:

1. The process of making an oleo-resinous metal surface coating composition having improved covering and leveling characteristics and adapted for rapid drying, comprising cooking a varnish type resin in a fast drying oil of high iodine value at an elevated temperature until solution is obtained, and incorporating in said solution substantially from one to thirty-three percent of normal tri-alkyl phosphate, the alkyl radical of which contains substantially from 2 to 4 carbon atoms, said tri-alkyl phosphate when used in the quantities of from one to ten percent by weight functioning principally as a powerful wetting agent and when used in quantities of from ten to thirty-three percent by weight functioning additionally as a strong solvent of narrow boiling range for the ingredients of said composition.

2. An oleo-resinous coating composition adapted to firmly adhere to metal surfaces and having improved covering and leveling properties and which is also susceptible to rapid drying, comprising a solution of varnish type resin and a fast drying oil high in iodine value, said solution having incorporated therein substantially one to ten percent of normal tri-alkyl phosphate, the alkyl radical of which contains substantially two to four carbon atoms, said tri-alkyl phosphate functioning principally as a powerful wetting agent and producing a smooth, hard and flexible protective film for metal surfaces.

3. An oleo-resinous coating composition adapted to firmly adhere to metal surfaces and having improved covering and leveling properties and which is also susceptible to rapid drying, comprising a solution of varnish type resin and a fast drying oil high in iodine value, said solution having incorporated therein substantially ten to thirty-three percent of normal tri-alkyl phosphate, the alkyl radical of which contains substantially two to four carbon atoms, said tri-alkyl phosphate functioning both as a powerful wetting agent and a strong solvent of narrow boiling range to produce a smooth, hard and flexible protective film for metal surfaces.

4. An oleo-resinous coating composition adapted to firmly adhere to metal surfaces and having improved covering and leveling properties and which is also susceptible to rapid drying, comprising a solution of a varnish type resin and a fast drying oil high in iodine value, said solution having incorporated therein substantially one to thirty-three percent of normal tri-alkyl phosphate, the alkyl radical of which contains substantially two to four carbon atoms, said tri-alkyl phosphate when present in quantities of one to ten percent by weight functioning principally as a wetting agent and when present in quantities of ten to thirty-three precent by weight functioning additionally as a strong solvent of narrow boiling range for the ingredients of said composition.

HERBERT J. WOLFE.